United States Patent Office 2,885,451
Patented May 5, 1959

2,885,451

PREPARATION OF PARA-SUBSTITUTED CYCLIC COMPOUNDS

Carl B. Linn, Riverside, Ill., assignor, by mesne assignments, to Universal Oil Products Company, Des Plaines, Ill., a corporation of Delaware No Drawing. Application November 24, 1954
Serial No. 471,080

1 Claim. (Cl. 260—668)

This invention relates to a process for preparing para-dialkyl-substituted cyclic compounds, and more particularly to a process for preparing para-xylene, and other para-substituted aromatic compounds which may be oxidized to terephthalic acid.

The increased use of terephthalic acid as an intermediate in the preparation of synthetic fibers of the glycol-terephthalic type has increased the demand for para-xylene from which the terephthalic acid is usually prepared. Heretofore, the separation of para-xylene from its ortho- and meta-isomers has been relatively expensive due to difficulties encountered in the separation process. One method of preparing a para-xylene from ethylbenzene and its isomers is to subject the mixture to fractional distillation. However, since para- and meta-xylene boil within 1° C. of each other their separation by fractional distillation is impractical.

One method of xylene separation is to distill out the ortho-xylene which has a boiling point of approximately 5° to 6° C. above its isomers, namely, meta- and para-xylene and ethylbenzene. The para- and meta-xylene along with the ethylbenzene may then be separated into three distillate fractions, the lightest cut containing the highest percentage of para-xylene which may then be separated out by crystallization.

Another method of separating the para-xylene is to displace the eutectic composition of para- and meta-xylenes by the addition of a solvent such as pentene, followed by cooling the para-xylene separating out and crystallizing. Still another method of recovering para-xylene is partially to sulfonate the mixture, separate the unsulfonated layer from the reaction mixture and crystallize the para-xylene from the mixture by lowering the temperature.

It is therefore an object of this invention to provide a novel process for the preparation of para-dialkyl cyclic compounds.

A further object of this invention is to provide a novel process for preparing para-dialkyl aromatic compounds by isomerizing meta-dialkyl cyclic compounds.

A specific object of this invention is to provide a process for preparing para-xylene by isomerizing meta-cycloalkyl compounds and dehydrogenating the resulting para-cycloalkyl compounds.

One embodiment of this invention resides in a method for preparing a para-dialkyl cyclic compound by subjecting a naphthene having the formula $C_8H_{16}$ to the action of a hydrogen fluoride catalyst at isomerizing conditions.

Another embodiment of this invention resides in a method for preparing a para-dialkyl cyclic compound by subjecting a 1,3-dialkylcycloalkyl compound to the action of a hydrogen fluoride catalyst at isomerizing conditions.

Still another embodiment of the invention resides in a method for preparing para-xylene which comprises subjecting a naphthene of the formula $C_8H_{16}$ to the action of a hydrogen fluoride catalyst at isomerizing conditions and thereafter dehydrogenating the resultant 1,4-dimethylcyclohexane.

A specific embodiment of the invention resides in a method for preparing para-xylene by subjecting 1,3-dimethylcyclohexane to the action of a hydrogen fluoride catalyst at isomerizing conditions and thereafter dehydrogenating the resultant 1,4-dimethylcyclohexane in the presence of a aromatizing catalyst to form para-xylene.

Another specific embodiment of the invention resides in a process for the preparation of para-xylene by hydrogenating meta-xylene in the presence of a hydrogenation catalyst comprising nickel-kieselguhr at a temperature in the range of from about 75° to about 275° C. and at a hydrogen pressure in the range of from about 50 to about 140 atmospheres, contacting the resultant 1,3-dimethylcyclohexane with a hydrogen fluoride catalyst at isomerizing conditions and thereafter dehydrogenating the resultant 1,4-dimethylcyclohexane with a dehydrogenating catalyst such as an alumina-chromia mixture, platinum on alumina, platforming catalyst or the like at a temperature in the range of from about 200° to about 600° C. to form para-xylene.

Other objects and embodiments of this invention will be set forth in the following further detailed description of this invention.

It has now been discovered that a dialkyl-substituted saturated cycloalkyl compound may be isomerized in the presence of an acidic catalyst to form isomers thereof, among which will be found 1,4-di-substituted cyclohexane, after which the isomeric product may be dehydrogenated to form the corresponding dialkyl-substituted aromatic compounds containing the corresponding 1,4-dialkylbenzene.

Dialkyl-substituted saturated cycloalkyl compounds which may be isomerized according to the process of this invention include 1,2-dimethylcyclohexane, 1,3-dimethylcyclohexane, 1,2-diethylcyclohexane, 1,3-diethylcyclohexane, 1,2-dipropylcyclohexane, 1,3-dipropylcyclohexane, 1,2-dimethylcycloheptane, 1,3-dimethylcycloheptane, 1,2-diethylcycloheptane, 1,3-diethylcycloheptane, dialkylcyclopentanes, etc.

It is also contemplated within the scope of this invention that napthenes of the formula $C_8H_{16}$ such as ethylcyclohexane may also be isomerized to form 1,4-dimethylcyclohexane. The isomerization of the aforementioned dialkyl-substituted cycloalkyl compounds and naphthenic compounds having the general formula $C_8H_{16}$ to form the 1,4-dialkylcyclohexane isomer is usually carried out in the presence of a strong acidic catalyst, anhydrous hydrogen fluoride being the preferred catalyst for this step of the operation. However, other strong acidic catalysts may also be used, although not necessarily with equivalent results. The isomerization of the cycloakyl compound may be carried out at atmospheric temperatures in the range of from about 20° to about 30° C.; however, elevated temperatures, i.e. 50–100° C. may also be used to speed up the reaction without impairing the results. The isomerized dialkyl-substituted cyclohexane compound may then by dehydrogenated to form the corresponding dialkyl-substituted aromatic compound, the dehydrogenation step being carried out in the presence of various catalysts among which may be mentioned oxides of metals occupying the left-hand column of group VI of the periodic table composited on a solid carrier, and also metals of the platinum group deposited upon a suitable carrier. The solid carriers may comprise inorganic oxides such as alumina, silica, magnesia, etc. or mixtures thereof such as alumina-silica, alumina-magnesia, silica-alumina-magnesia, etc. An effective dehydrogenation catalyst comprises an alumina-chromia mixture, while another is platinum metal on alumina. The dehydrogenation of the para-dialkyl cycloalkyl compound to the corresponding para-dialkyl aromatic compound is carried out at elevated temperatures in the range of from about 200° to about 600° C. The preferred range is dictated or imposed by the specific aromatizing catalyst used.

If so desired, the para-dialkyl cyclic compound may be prepared from the corresponding meta- or ortho-dialkyl aromatic compound. In this case, the ortho- or meta-dialkyl aromatic compound is first hydrogenated to form corresponding ortho- or meta-dialkylcycloalkyl compounds. This hydrogenation is carried out in the presence of a hydrogen catalyst such as nickle-kieselguhr at temperatures in the range of from about 75° to about 275° C. at a hydrogen pressure in the range of from about 50 to about 500 atmospheres. Therefore, in the event that meta- or ortho-xylene or isomeric ethylbenzene is readily available and the desired end-product comprises para-xylene, it is possible, according to the process of this invention, to hydrogenate the ortho- or meta-xylene to form 1,2- or 1,3-dimethylcyclohexane and ethylbenzene to ethylcyclohexane, isomerize these compounds to form 1,4-dimethylcyclohexane, and dehydrogenate the latter compound to form para-xylene.

The process of this invention may be effected in any suitable manner and may comprise either a batch or continuous type of operation. When a batch type operation is used, a quantity of the starting material, if said material comprises a dialkyl-substituted aromatic compound, is placed in a suitable reaction vessel and hydrogenated in the presence of a hydrogenation catalyst. Upon completion of the hydrogenation, the product is then filtered, placed in a second reaction vessel, and subjected to isomerization in the presence of an acidic catalyst. The isomerized product then may be separated from the unreacted materials by conventional means, for example, by fractional distillation or this separation step omitted. The rearranged naphthene mixture is next catalytically dehydrogenated at an elevated temperature and in the presence of a dehydrogenation catalyst to form the para-dialkyl aromatic compound. If the starting material comprises an ortho- or meta-dialkylcycloalkyl compound, the first step of the process is omitted, and the isomerization step comprises the initial reaction of the process.

Another method of operation of the present process is of the continuous type. In this type, the starting material, if said material comprises a dialkyl-substituted aromatic compound, is continuously charged to a reaction vessel containing a hydrogenation catalyst, said vessel being maintained at the desired operating conditions of temperature and hydrogen pressure. The reaction zone may be an unpacked vessel or coil or it may contain an adsorbent packing material such as fire brick, alumina, dehydrated bauxite, and the like. The hydrogenated cycloalkyl compound is continuously withdrawn, and continuously charged to a second reaction vessel containing the isomerization catalyst. This second vessel, like the first, is also maintained at suitable operating conditions of temperature and pressure wherein the dialkyl-substituted cycloalkyl compound is isomerized. The reaction product from the second reactor, after the desired residence time, is withdrawn from the second reactor, following which there may or may not be a separation step by distillation. The resulting naphthenic material, now substantially richer in 1,4-di-substituted cyclohexane than it was initially, is continuously charged to a third reactor containing the dehydrogenation catalyst wherein the cycloalkyl compound is dehydrogenated to form the para-dialkyl aromatic compound. The hydrogen furnished by the last step will ordinarily be employed to hydrogenate the aromatic material in the first step. In each of the aforementioned three steps of the continuous process, if desired, unreacted starting materials, after being separated from the desired product of each step, may be recycled to the particular reactor involved to form a portion of the feed stock for that step.

The following example is given to illustrate the process of this invention which, however, is not intended to limit the generally broad scope of the present invention in strict accordance therewith.

*Example*

A quantity of m-xylene was placed in a glass liner of an autoclave and hydrogenated at a temperature of 120° C. and at a hydrogen pressure of from 100 to 140 atmospheres until no more absorption of hydrogen was noted. This hydrogenation step was performed in the presence of a nickel-kieselguhr catalyst. The product of the hydrogenation comprising 1,3-dimethylcyclohexane was filtered and placed in a 1 liter turbomixer.

The 1,3-dimethylcyclohexane was contacted in said turbomixer with 240 g. of anhydrous hydrogen fluoride for 60 hours at a temperature in the range of from about 27° to about 33° C. At the end of this time the product was discharged into ice, water washed and dried. Analysis by infra-red method showed a substantial rearrangement to 1,4-dimethylcyclohexane. The product was next passed at 300° C. over a catalyst containing platinum deposited upon alumina which quantitatively converted the naphthenic material into a xylene fraction containing a substantial amount of para-xylene. Thus a pure meta-xylene was, in this experiment partially converted into the desirable para-isomer by the three step process indicated.

I claim as my invention:

A process for producing para-xylene from meta-xylene which comprises hydrogenating the meta-xylene to form 1,3-dimethylcyclohexane, isomerizing the last-mentioned compound to 1,4-dimethylcyclohexane in the presence of a hydrogen fluoride catalyst at a temperature of from about 20° to about 100° C. and dehydrogenating said 1,4-dimethylcyclohexane to form para-xylene therefrom.

References Cited in the file of this patent

UNITED STATES PATENTS

| | | |
|---|---|---|
| 2,288,866 | Hoog | July 7, 1942 |
| 2,346,294 | Danforth | Apr. 11, 1944 |
| 2,562,926 | Legatski | Aug. 7, 1951 |
| 2,653,175 | Davis | Sept. 22, 1953 |
| 2,784,241 | Holm | Mar. 5, 1957 |

OTHER REFERENCES

Adkins: "Reaction of Hydrogen, etc." (1937), pages 56, 57, publisher, University of Wisconsin Press, Madison, Wisconsin.

Norris: "Jour. Amer. Chem. Soc." (1939), vol. 61, pages 2131–34.

Faraday: "Encyclopedia of Hydrocarbon Compounds," vol. $C_8H_{16-18}$, pages 08186.00.11, 08186.00.12, 08186.00.13 (1947), Chemindex Lt., publishers, Manchester, England.

Chiurdoglu et al.: "Chem. Abstracts," vol. 45 (1951), column 7026[b].

Roebuck et al.: Jour. Amer. Chem. Soc., vol. 75, 1953, pp. 1631–1635.